Figure 1:
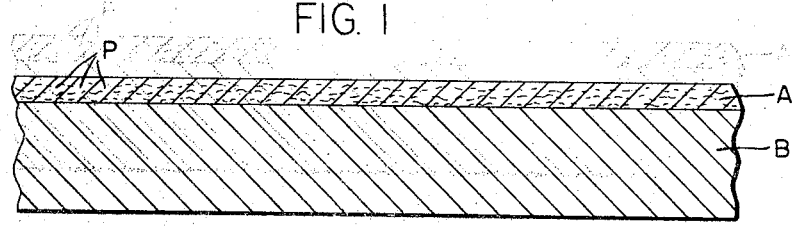

Jan. 17, 1967  A. SZEGVARI  3,298,896

FILM FOR RECEIVING, STORING OR CONTROLLING ELECTRIC IMPULSES

Filed May 23, 1962

*INVENTOR.*
ANDREW SZEGVARI

United States Patent Office 3,298,896
Patented Jan. 17, 1967

---

3,298,896
FILM FOR RECEIVING, STORING OR CONTROLLING ELECTRIC IMPULSES
Andrew Szegvari, 201 Castle Blvd., Akron, Ohio 44313
Filed May 23, 1962, Ser. No. 203,423
4 Claims. (Cl. 161—164)

This application is a continuation-in-part of application Serial No. 464,001, filed October 22, 1954, now abandoned.

This invention relates to the production of film of laminated plastic capable of receiving, storing or controlling electric impulses. At least one ply of the film is formed from a latex-type liquid in which the film-forming material is suspensoid in character and forms a discontinuous phase, and another ply is formed from a cement- or solvate-type system in which the film-forming constituent is present in a continuous phase. The ply formed from the latex is deposited on a ply formed from the cement-type of liquid. The ply formed from the latter contains finely divided pigment which has electrical properties useful in such film. This pigment is uniformly dispersed in the cement-type of liquid in a very high state of microscopic homogeneity.

"Cement" is used herein to refer to a plastic-type high-molecular-weight elastomeric material solvated in a volatile solvent which peptizes the plastic preferably to a low viscosity fluid. The plastic may, for example, be rubber, a synthetic rubber, a vinyl resin, chlorinated rubber, etc. The solvent will depend upon the nature of the plastic, and may, for example, be methyl alcohol, ethyl alcohol, butyl alcohol or other low-boiling alcohol; methyl acetate, amyl acetate, ethyl butyrate or other ester; methylethyl ketone or other ketone; a low-boiling coal tar or petroleum fraction, etc. By low boiling I mean a solvent which evaporates sufficiently rapidly under conditions of commercial production to permit cements made therefrom to be used in large scale dipping operations, with subsequent rapid evaporation of the solvent therefrom.

At least some of the pigment in the film has particular electrical properties either electric or magnetic or both, which are needed in a recording tape. The term "pigment" is used herein to include other finely dispersed solids such as vulcanizing ingredients in a rubber cement or latex, stabilizers, etc.

Dispersion of the pigment in the cement may be accomplished in a ball mill or the like, or preferably a device such as described in my U.S. Patent 2,764,359 granted September 25, 1956, in which small substantially spherical attritive elements of substantially the same diameter immersed in a liquid in a vessel are agitated by agitating means so that substantially all of the elements are kept in constant motion and are repeatedly brought into substantially instantaneous contact with one another while being kept out of static contact with one another. A latex-type system in which the film-forming substituent is suspensoid, when subjected to such treatment is coagulated. However, a cement-type liquid containing a pigment may be subjected to such treatment satisfactorily. The pigment may be ground as it is dispersed. It may be ground to as small as .05 to 1.0 micron. No coagulation of the cement occurs.

These two types of systems, the latex-type and the cement type, have entirely different properties and different conditions affect and control the films deposited from them. Latex-type systems can be obtained with very high concentrations of the film-forming component, much higher than are obtainable with the cement-type systems, and methods have been developed by which deposits of considerable thickness can be formed in a single dipping operation, much thicker than are obtainable by a single dipping in a cement type system. The so-called coagulant process is most widely used for that purpose. Because of the rapidity with which thick deposits can be obtained, the latex-type system is generally preferred to the cement-type, where the circumstances are such that it can be used.

The latex-type systems have certain limitations, imposed to large extent by the nature of the suspended film-forming constituent. For instance, it is difficult or impossible to incorporate many finely divided materials in such systems. For example, the reinforcement of rubbers by carbon black and certain other pigments require that the reinforcing pigment be distributed in the film-forming component with microscopic homogeneity. The suspended particles of the film-forming component of a latex-type system have a diameter (or other through measurement) of $\frac{1}{10}$ to 1 micron, and usually even larger, which is so large as to prohibit obtaining microscopic homogeneity of a pigment therein, and grinding causes coagulation. Likewise, it is impossible to incorporate in most latex-type systems materials which have a positive electric charge or a great tendency for kinetic instability, regardless of the degree of homogeneity required. Such materials cause flocculation in such systems making them difficult to use in industrial processing. Some organic bases, such as diphenyl guanidine, etc. cause coagulation of a latex-type system. Inorganic bases such as magnesium oxide, calcium oxide, etc. also act as coagulants.

Cement-type systems are usually high in viscosity even in low concentrations and therefore only thin films can be dipped in one step. On the other hand, a very high degree of microscopic homogeneity is obtainable if the fundamental matrix is entirely solvated, particularly if suitable process means is employed such as is described in my said patent. Furthermore, the matrix in the solvated condition acts as a protective colloid in the distribution of pigments, which is particularly valuable in the distribution of pigments which are difficult to disperse.

The process lends itself to the production of belts for tape recordings with particular and desirable properties. Pigments such as carbon black, zinc oxide, etc. may be dispersed in a cement for dipping the surface ply of the belt which must be abrasion resistant. Neoprene may be pigmented with finely divided magnesium oxide for curing. Products formed of a thin first ply dipped from such cement-type systems containing pigments having electrical or magnetic properties may be covered and rapidly built up to a desired thickness by subsequent dipping in a latex-type system. For electrical or electronic effects or for other reasons it may be desirable to have the surface ply free of pigments and to incorporate then only in an under ply, and the pigment is then located in one ply dipped from a cement-type system, the surface ply dipped from a cement-type system being entirely free of pigment for chemical reasons, physical reasons, economic reasons, etc., except that if the film-forming material is to be cured, the curing ingredients are suspended in the system.

The following preferred procedure utilizes both systems and gives a product in which the film-forming material deposited from the latex-type system is firmly adhered to a film-forming material deposited from a cement-type system. The form is first dipped into a cement-type liquid containing the controlling pigments uniformly distributed therein. The deposit is evaporated to dryness. The dry film is heated to a temperature above 120° F., and preferably 160° F., or thereabouts, and in this warm condition is dipped into the latex-type liquid. The film is semi-dried, and then dipped into a coagulant, of which there are many such as acetic or hydrochloric acid in water, calcium nitrate in water, calcium chloride plus zinc chloride in alcohol, calcium chloride in a mixture of alcohol and acetone, ammonium borate plus boric acid in water. The form covered with a film deposit is then generally dipped into the same or a different latex-type liquid and left there for the time required to form a deposit of the required thickness. (Several dips in the same or different suspensoids, may be used with intervening dips in coagulant.) The article is then preferably washed, and is then dried and if it is curable, it is then cured.

Figure 2:
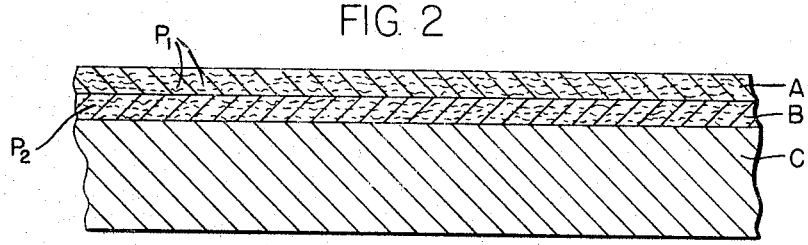

The invention is illustrated in the accompanying drawings which illustrate, on a magnified scale, sections through the film, FIGURE 1 illustrating a film with a thin surface ply of film-forming material containing pigment uniformly distributed therein in a high state of microscopic homogeneity on a thicker ply of coagulated latex-type film-forming material; and FIGURE 2 illustrating a film with two adjoining pigmented plies.

FIGURE 1 illustrates a section through a laminated film of two plies. Ply A is deposited from a cement-type liquid and contains the pigment P. The ply B is deposited from latex-type liquid, and is formed on ply A deposited from cement-type liquid. The film former of ply B may be the same as that in ply A, or different. For instance, both may be Hevea rubber or both may be a vinyl resin. Except for the pigment they may be compounded the same so that they vulcanize simultaneously, or they may be compounded differently. Alternatively, the different plies may be composed of differennt plastics, e.g. ply A may be vinyl resin, chlorinated rubber, etc. and ply B may be natural rubber, butadiene-styrene synthetic rubber, a neoprene, etc.

In FIGURE 2, the plies A and B are pigmented and deposited from cement-type liquids. Ply C is deposited from latex-type liquid. The plastic of the ply C may be the same as that of both plies A and B, if the same; or the same as either ply A or B, if different; or different from both plies A and B. If plies A and B are both formed from the same plastic, the pigments P–1 and P–2 may be different, or the pigments in these two plies may be the same and used in the same or different proportions. If the plastics in plies A and B are different, the pigments P–1 and P–2 may be the same or different.

The inveniton is further illustrated by the following examples.

*Example 1*

In making a film in the form of a belt, one surface of which is pigmented with pigment having the desired electrical properties, the balance of the belt being unpigmented, the belt may be formed with the pigment in the inner surface and then turned inside out.

A highly polished cyinldrical form is dipped into a suspension of 20 parts fine soapstone in 100 parts alcohol. After evaporating the solvent the form is dipped in a cement-type liquid of the following composition:

| | Parts by weight |
|---|---|
| Neoprene GN | 100 |
| Zinc oxide | 4 |
| Magnesium oxide | 5 |
| Fine particle size Furnace Black | 10 |
| Ferric oxide | 90 |
| Paraffin wax | 3 |
| Stearic acid | 1 |
| Neozone D | 2 |

The foregoing composition is processed to a 30 percent concentration in toluene. This requires five hours in apparatus of the type described in my aforesaid patent, or much longer in a ball mill.

The form is dipped in the cement, removed, the solvent evaporated until semi-dried, dipped again and the solvent evaporated completely. Thereafter the form is heated up to 160° F. and dipped into the following latex compound:

| | Parts by weight(dry) |
|---|---|
| Neoprene Type 571 | 100 |
| Zinc oxide | 5 |
| Semi-reinforcing Furnace Black | 10 |
| Clay (finely ground) | 10 |
| Neozone D | 2 |

After dipping into this compound the form is removed, semi-dried and dipped into a coagulant containing 80 g. of methyl alcohol, 20 g. ethyl alcohol, 30 g. acetone, and 35 g. calcium nitrate. On removal from this coagulant the solvent is evaporated, and the form is again dipped in the latex for 40 seconds. It is then dipped again in the coagulant, and after evaporation of the solvent, is finished by dipping again for 40 seconds in the neoprene latex. It is dried and then cured at 300° F. for 20 minutes, washed at 160° F. for 25 minutes and removed from the form.

*Example 2*

The form is first dipped in a pigmented cement of the following composition:

| | Parts by weight |
|---|---|
| Natural rubber | 100 |
| Furnace Black (fine particle size) | 10 |
| Ferric axide | 65 |
| Zinc oxide | 5 |
| Altax [1] | 1.1 |
| Tuads [2] | 0.2 |
| Sulfur | 3 |
| Agerite Powder [3] | 1 |
| Stearic acid | 1 |

[1] Altax is essentially benzothiazyl disulfide.
[2] Tuads is essentially tetramethyl tetrathiuram disulfide.
[3] Agerite Powder is phenyl-beta-naphthylamine.

The foregoing composition is intimately ground into equal parts of petroleum naphtha and toluene to obtain a cement of 20 percent strength. When ground in a device of the type described in my aforesaid patent, three hours is required. Longer grinding is required in a ball mill. The form is dipped in the cement, removed, allowed to semi-dry, dipped again and then completely dried.

The coated form is then heated to 160° F. and dipped into a latex of the following composition:

| | Parts by weight |
|---|---|
| Natural rubber latex [1] | 100 |
| Titanium dioxide | 20 |
| Clay (finely ground) | 5 |
| Brown pigment color | 3 |
| Zinc oxide | 3 |
| Sulfur | 1.1 |
| Zenite [2] | 1 |
| Zimate [3] | 0.05 |
| Age resistor 2246 [4] | 1 |

[1] 100 parts (dry weight) is used.
[2] Zenite is essentially the zinc salt of 2-mercaptobenzothiazole.
[3] Zimate is essentially zinc dimethyldithiocarbamate.
[4] Age resistor 2246 is essentially 2,2'-methylene-bis(4-methyl-6-tert-butylphenol).

The various pigments are each finely ground before mixing with the latex.

The warm form on which a film has been formed from the cement is dipped into the latex compound, removed and dried until it becomes semi-solid. Thereafter it is dipped into a coagulant consisting of 100 g. ethyl alcohol, 40 g. calcium nitrate, 20 g. acetone, and 0.5 g. Emulphor A (non-ionic emulsifying and dispersing agent). After removing from the coagulant, and evaporation of the solvent, it is dipped again into the foregoing latex compound for 80 seconds. The completed dip is removed, dried, and cured 30 minutes at 240° F. After curing it is washed in water at 160° F. for 30 minutes, dried again, and then turned inside out as it is removed from the form.

The examples are illustrative. The invention is defined in the claims that follow.

What I claim is:

1. Recording film of uniform thickness having a relatively thick lamina of a latex-type elastomeric film-former and a relatively less thick smooth-surfaced, solid lamina which is a flexible matrix of a cement-type elastomeric film-former having finely ground magnetizable or electrically conductive pigment uniformly dispersed therein in a very high state of microscopic homogeneity; the lamina of latex-type elastomeric film-former being free of such pigment.

2. The film of claim 1 which is in the form of a belt and in which the latex-type film-former is vulcanized rubber.

3. The film of claim 1 which is in the form of a belt and in which the pigment is ferric oxide.

4. The film of claim 1 which is in the form of a belt and in which the pigment is electrically conductive.

References Cited by the Examiner

UNITED STATES PATENTS

| | | | |
|---|---|---|---|
| 1,969,275 | 8/1934 | Ogilby | 18—58 |
| 2,095,107 | 10/1937 | Szegvari | 18—58.4 X |
| 2,175,801 | 10/1939 | Holden | 260—111 |
| 2,789,933 | 4/1957 | Bargmeyer | 161—164 |
| 2,796,359 | 6/1957 | Speed. | |
| 2,862,845 | 12/1958 | Szegvari | 154—53.6 |
| 2,880,279 | 3/1959 | Nickerson | 179—100.2 |

EARL M. BERGERT, *Primary Examiner.*

L. T. PIRKEY, C. B. COSBY, *Assistant Examiners.*